US010012271B2

(12) United States Patent
Yamashita et al.

(10) Patent No.: US 10,012,271 B2
(45) Date of Patent: Jul. 3, 2018

(54) CLUTCH DEVICE

(71) Applicants: JTEKT CORPORATION, Osaka-shi (JP); TOYOTA JIDOSHA KABUSHIKI KAISHA, Toyota-shi (JP)

(72) Inventors: Yutaka Yamashita, Nagoya (JP); Kunihiko Suzuki, Gamagori (JP); Takahiro Yoshimura, Toyota (JP)

(73) Assignees: JTEKT CORPORATION, Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/463,338

(22) Filed: Mar. 20, 2017

(65) Prior Publication Data

US 2017/0276192 A1  Sep. 28, 2017

(30) Foreign Application Priority Data

Mar. 23, 2016 (JP) ................................. 2016-058898

(51) Int. Cl.
*F16D 13/74* (2006.01)
*F16D 27/06* (2006.01)
(Continued)

(52) U.S. Cl.
CPC ............. *F16D 13/74* (2013.01); *F16D 13/40* (2013.01); *F16D 13/64* (2013.01); *F16D 13/648* (2013.01); *F16D 27/06* (2013.01)

(58) Field of Classification Search
CPC .......... F16D 27/00–27/14; F16D 13/40; F16D 13/74; F16D 13/72; F16D 13/64; F16D 13/648
See application file for complete search history.

(56) References Cited

U.S. PATENT DOCUMENTS

2009/0014271 A1* 1/2009 Matsumoto ........... F16D 27/115
192/84.1
2014/0182995 A1* 7/2014 Ando ...................... F16D 13/62
192/107 R
(Continued)

FOREIGN PATENT DOCUMENTS

JP  2015-129574  7/2015

*Primary Examiner* — Ramya P Burgess
*Assistant Examiner* — Lillian T Nguyen
(74) *Attorney, Agent, or Firm* — Oblon, McClelland, Maier & Neustadt, L.L.P.

(57) ABSTRACT

A clutch device includes an outer member including a cylindrical part having an inner peripheral surface provided with outer projections extending in an axial direction; an inner member rotatable relative to the outer member; an outer friction member engaging with the outer projections such that the outer friction member is movable in the axial direction and rotation of the outer friction member relative to the outer member is restricted; an inner friction member whose rotation relative to the inner member is restricted, and which generates a frictional force between the inner and outer friction members; and a lubricating oil sealed in a clutch chamber located between the outer member and the inner member. The outer member is provided with an oil pocket recessed to a position outward of a bottom surface of a recessed part located between a pair of adjacent outer projections among the outer projections.

6 Claims, 4 Drawing Sheets

(51) Int. Cl.
  *F16D 13/40* (2006.01)
  *F16D 13/64* (2006.01)

(56) References Cited

U.S. PATENT DOCUMENTS

| | | | |
|---|---|---|---|
| 2015/0192198 A1* | 7/2015 | Suzuki .................. | B60K 17/35 180/233 |
| 2015/0267761 A1* | 9/2015 | Yoshimura .............. | F16D 13/52 180/249 |
| 2017/0089404 A1* | 3/2017 | Ohno ...................... | F16D 13/40 |

* cited by examiner

CLUTCH DEVICE

INCORPORATION BY REFERENCE

The disclosure of Japanese Patent Application No. 2016-058898 filed on Mar. 23, 2016 including the specification, drawings and abstract is incorporated herein by reference in its entirety.

BACKGROUND

1. Technical Field

The disclosure relates to a clutch device in which frictional sliding between clutch plates is lubricated by lubricating oil.

2. Description of Related Art

A clutch device in which frictional sliding between clutch plates is lubricated by lubricating oil has been used as, for example, a driving force transmission device which transmits a driving force of a vehicle (see, for example, Japanese Patent Application Publication No. 2015-129574 (JP 2015-129574 A)).

The driving force transmission device described in JP 2015-129574 A includes an outer rotary member and an inner rotary member which are able to coaxially rotatable relative to each other; an electromagnetic clutch mechanism including pilot outer clutch plates and pilot inner clutch plates which are formed of a magnetic material such as iron; a cam mechanism which is activated by a torque transmitted by the electromagnetic clutch mechanism; and a main clutch including main outer clutch plates and main inner clutch plates, the main clutch being configured to connect the outer rotary member and the inner rotary member so as to allow torque transmission, in response to an axial pressing force provided by the earn mechanism.

The electromagnetic clutch mechanism includes an electromagnetic coil which generates a magnetic force when a current is applied to the electromagnetic coil; a yoke which holds the electromagnetic coil; and an armature which is drawn toward the yoke by the magnetic force of the electromagnetic coil. The pilot outer clutch plates and the pilot inner clutch plates are disposed between the yoke and the armature. When a current is applied to the electromagnetic coil, a torque of the outer rotary member is transmitted to the cam mechanism via the pilot outer clutch plates and the pilot inner clutch plates, and the cam mechanism is activated to press the main clutch.

Lubricating oil is sealed between the outer rotary member and the inner rotary member, and frictional sliding between the pilot outer and inner clutch plates and frictional sliding between the main outer and inner clutch plates are lubricated by the lubricating oil.

An inner peripheral spline part having a plurality of axially extending spline projections is formed on an inner peripheral surface of the outer rotary member. The pilot outer clutch plates and the main outer clutch plates engage with the inner peripheral spline part such that the pilot outer clutch plates and the main outer clutch plates are movable in an axial direction and are unable to rotate relative to the outer rotary member. A toothless part where no spline projection is formed is provided at a part of the inner peripheral spline part in the circumferential direction.

When a current is not applied to the electromagnetic coil, the lubricating oil is present between the pilot outer and inner clutch plates and between the main outer and inner clutch plates. When the current is applied to the electromagnetic coil, the lubricating oil present between the clutch plates flows in the axial direction, mainly via the toothless part and is discharged from an area between the clutch plates.

SUMMARY

The lubricating oil present between the clutch plates has viscosity, and thus causes a drag torque when the inner rotary member rotates relative to the outer rotary member while a current is not applied to the electromagnetic coil. Further, torque transmission due to friction is not performed unless the lubricating oil is discharged from the area between the clutch plates when the current is applied to the electromagnetic coil. Thus, the lubricating oil may cause a decrease in responsiveness (i.e., responsiveness in increasing the transmitted torque). The above-described situations are improved by reducing the amount of the lubricating oil. However, in a case where the amount of the lubricating oil is reduced, abrasion is likely to occur during the frictional sliding between the clutch plates. Further, when the amount of the lubricating oil is reduced, abrasion powder of iron or the like, which has been generated due to the abrasion of the clutch plates, is likely to react with an additive (for example, a phosphate compound or organic acid salt) in the lubricating oil. This may promote deterioration in the performance of the lubricating oil.

The disclosure provides a clutch device that makes it possible to achieve both reduction of a drag torque and suppression of abrasion of clutch plates.

An aspect of the disclosure relates to a clutch device including an outer member including a cylindrical part having an inner peripheral surface provided with a plurality of outer projections extending in an axial direction; an inner member disposed so as to be rotatable relative to the outer member; an outer friction member engaging with the outer projections such that the outer friction member is movable in the axial direction and rotation of the outer friction member relative to the outer member is restricted; an inner friction member whose rotation relative to the inner member is restricted, and which generates a frictional force between the inner friction member and the outer friction member; and a lubricating oil sealed in a clutch chamber located between the outer member and the inner member, the lubricating oil lubricating sliding between the outer friction member and the inner friction member. The outer member is provided with an oil pocket that is recessed to a position outward of a bottom surface of a recessed part located between a pair of adjacent outer projections among the plurality of outer projections.

The clutch device according to the above-described aspect of the disclosure makes it possible to achieve both the reduction of the drag torque and the suppression of the abrasion of the clutch plates.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described with reference to FIGS. 1 to 5. Note that the embodiment described below is an example of the disclosure, and a technical scope of the disclosure is not limited to the embodiment.

Figure 1:
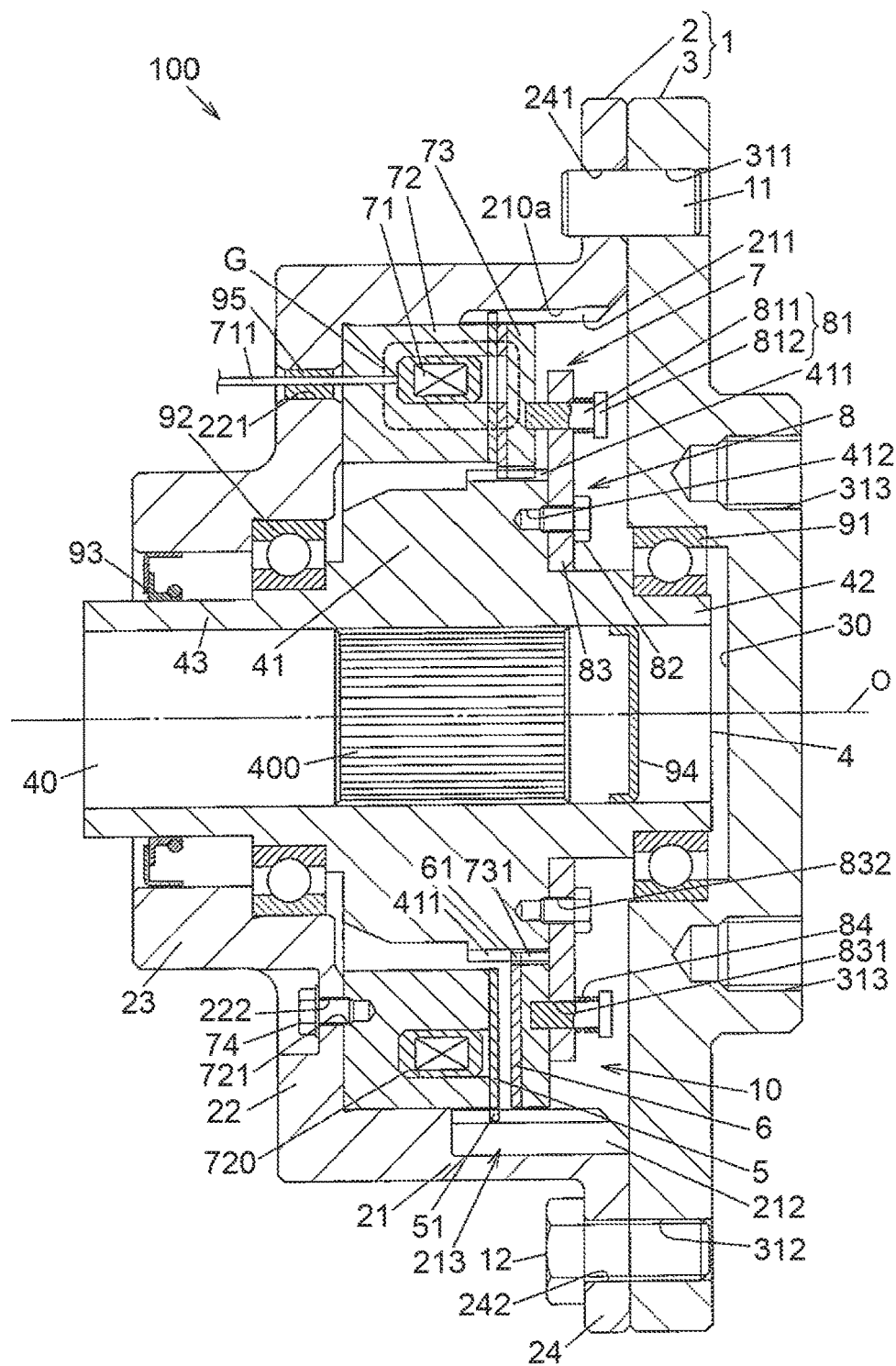
FIG. 1 is a sectional view illustrating a clutch device according to an embodiment of the disclosure.

FIG. 1 is a sectional view illustrating a clutch device according to the embodiment of the disclosure. The clutch device 100 is provided in, for example, a vehicle, and is used for switching between a locked state in which a rotary member (not illustrated) is fixed so as to be unable to rotate relative to a vehicle body and an unlocked state in which the rotary member is rotatable relative to the vehicle body.

The clutch device 100 includes, as main components thereof, a clutch housing 1 as an outer member; an inner shaft 4 as an inner member which is disposed so as to be rotatable relative to the clutch housing 1; an outer clutch plate 5 as an outer friction member and an inner clutch plate 6 as an inner friction member, the outer clutch plate 5 and the inner clutch plate 6 being disposed between the clutch housing 1 and the inner shaft 4; a pressing mechanism 7 configured to press the outer clutch plate 5 and the inner clutch plate 6; a support mechanism 8 configured to support an armature 73 (to be described later) of the pressing mechanism 7; and lubricating oil which is sealed in a clutch chamber 10 located between the clutch housing 1 and the inner shaft 4. Note that illustration of the lubricating oil is omitted in FIG. 1.

The inner shaft 4 is rotatable relative to the clutch housing 1 around a rotational axis O. Hereinafter, a direction parallel to the rotational axis O is referred to as an axial direction. FIG. 1 illustrates, on the side located higher than the rotational axis O, an operating state (locked state) in which the outer clutch plate 5 and the inner clutch plate 6 are pressed and illustrates, on the side lower than the rotational axis O, a non-operating state (unlocked state) in which the outer clutch plate 5 and the inner clutch plate 6 are not pressed.

The pressing mechanism 7 includes an electromagnetic coil 71 configured to generate a magnetic force when a current is applied to the electromagnetic coil 71; a yoke 72 configured to hold the electromagnetic coil 71; and the armature 73 as a pressing member which is configured to move in the axial direction in response to the magnetic force of the electromagnetic coil 71. Each of the outer clutch plate 5 and the inner clutch plate 6 is a flat plate-shaped friction member formed of a soft magnetic material such as iron. The outer clutch plate 5 and the inner clutch plate 6 are disposed between the yoke 72 and the armature 73. The pressing mechanism 7 presses the outer clutch plate 5 and the inner clutch plate 6 in the axial direction to bring the outer clutch plate 5 and the inner clutch plate 6 into frictional contact with each other. The lubricating oil lubricates sliding between the outer clutch plate 5 and the inner clutch plate 6.

In the present embodiment, one outer clutch plate 5 and one inner clutch plate 6 are disposed between the yoke 72 and the armature 73. However, a plurality of outer clutch plates 5 and a plurality of inner clutch plates 6 may be disposed between the yoke 72 and the armature 73. In the case where the plurality of outer clutch plates 5 and the plurality of inner clutch plates 6 are disposed, the outer clutch plates 5 and the inner clutch plates 6 are disposed alternately in the axial direction.

The support mechanism 8 includes a plurality of support shafts 81 which are fixed on a side surface of the armature 73 located on a side opposite to the yoke 72; a support plate 83 with an annular shape which is fixed at the inner shaft 4 by a plurality of bolts 82; and a spring 84 which generates an urging force urging the armature 73 toward the side opposite to the yoke 72. Each of the support shafts 81 includes a shaft part 811 which extends through a through-hole 831 provided in the support plate 83; and a head part 812 which has a larger diameter than that of the shaft part 811. The spring 84 in a compressed state is disposed between the head part 812 of the support shaft 81 and the support plate 83.

In the present embodiment, the spring 84 is a coil spring which is fitted onto the shaft part 811 of the support shaft 81, but the spring 84 is not limited to the coil spring, and may be, for example, a disc spring. Moreover, in an example illustrated in FIG. 1, a distal end part of the shaft part 811 is press-fitted in a press-fit hole formed in the side surface of the armature 73 such that the support shaft 81 is fixed to the armature 73. However, the disclosure is not limited to this configuration. For example, a male thread may be provided at the distal end part of the shaft part 811 and the male thread may be screwed into a female thread formed at the armature 73 to fix the support shaft 81 to the armature 73.

The clutch housing 1 includes a clutch drum 2 with a bottomed cylindrical shape; and a cover member 3 with a circular plate shape which covers an opening formed at an axial one end part of the clutch drum 2. The clutch drum 2 and the cover member 3 are positioned in a circumferential direction and a radial direction by positioning pins 11 and also fixed to each other by bolts 12.

The clutch drum 2 is formed of non-magnetic metal such as austenitic stainless or aluminum, and integrally includes a cylindrical part 21 with a cylindrical shape; a bottom part 22 which extends inwardly from an axial one end of the cylindrical part 21; an extending part 23 which extends in the axial direction along the inner shaft 4 from an inner end part of the bottom part 22; and a flange part 24 which extends outwardly from another axial end part of the cylindrical part 21. The flange part 24 of the clutch drum 2 has through-holes 241 through which the positioning pins 11 are inserted; and bolt through-holes 242 through which shaft parts of the bolts 12 extend.

The cover member 3 has through-holes 311 through which the positioning pins 11 are inserted; first thread holes 312 to which male threads provided in the shaft parts of the bolts 12 are screwed; and second thread holes 313 for fixation to a support member, such as a bracket, fixed to a vehicle body. Moreover, the cover member 3 is provided with a recessed part 30 in which one end part of the inner shaft 4 is accommodated.

The outer clutch plate 5, the inner clutch plate 6, the pressing mechanism 7, and the support mechanism 8 are disposed in an inside of the cylindrical part 21 of the clutch drum 2. The cylindrical part 21 of the clutch drum 2 has an inner peripheral surface provided with outer spline projections 211 as a plurality of outer projections extending in the axial direction.

The inner shaft 4 is formed of nonmagnetic metal such as austenitic stainless or aluminum. The inner shaft 4 has a tubular shape and has a fitting hole 40 formed at a central part of the inner shaft 4. A rotary member (not illustrated) that rotates relative to the vehicle body is fitted into the fitting hole 40. The fitting hole 40 has an inner peripheral surface provided with a spline fitting part 400 to which a distal end part of the rotary member is connected so as to be unable to rotate relative to the inner shaft 4. The inner shaft 4 integrally includes a large diameter part 41 which has an outer peripheral surface provided with a plurality of inner spline projections 411 extending in the axial direction; a first small diameter part 42 which is provided on one axial side of the large diameter part 41; and a second small diameter part 43 which is provided on another axial side of the large diameter part 41.

The first and second small diameter parts 42 and 43 of the inner shaft 4 each have a smaller outside diameter than that of the large diameter part 41. The first small diameter part 42 has a distal end part accommodated in the recessed part 30 of the cover member 3. The second small diameter part 43 extends through the extending part 23 of the clutch drum 2. A first bearing 91 is disposed between an outer peripheral surface of the first small diameter part 42 and an inner peripheral surface of the recessed part 30. A second bearing 92 and a seal member 93 are disposed between an outer peripheral surface of the second small diameter part 43 and an inner peripheral surface of the extending part 23. The first and second bearings 91 and 92 support the inner shaft 4 such that the inner shaft 4 is rotatable relative to the clutch housing 1.

The seal member 93 seals a gap between the outer peripheral surface of the second small diameter part 43 and the inner peripheral surface of the extending part 23 to prevent leakage of the lubricating oil. A cap 94 which prevents the leakage of the lubricating oil from the fitting hole 40 is disposed on an inner surface of the fitting hole 40 at a position closer to the recessed part 30 than the spline fitting part 400 is.

The outer spline projections 211 are provided at parts on a cover member 3-side in the axial direction, in the inner peripheral surface of the cylindrical part 21 of the clutch drum 2 (i.e., the outer spline projections 211 are provided on the inner peripheral surface of the cylindrical part 21 at positions close to the cover member 3). The inner spline projections 411 are provided at portions of the outer peripheral surface of the large diameter part 41 of the inner shaft 4, the portions facing the outer spline projections 211 in the radial direction. The large diameter part 41 of the inner shaft 4 has thread holes 412 with which the bolts 82 are screwed, the bolts 82 extending through bolt through-holes 832 of the support plate 83.

The bottom part 22 of the clutch drum 2 has through-holes 221 and bolt through-holes 222. Cables 711 for supplying an exciting current to the electromagnetic coil 71 extend through the through-holes 221. Bolts 74 for fixing the yoke 72 extend through the bolt through-holes 222. Grommets 95 are fitted into the through-holes 221. The bolts 74 extending through the bolt through-holes 222 are screwed to thread holes 721 of the yoke 72. The electromagnetic coil 71 is accommodated in an annular recessed part 720 formed at the yoke 72.

Figure 2A:
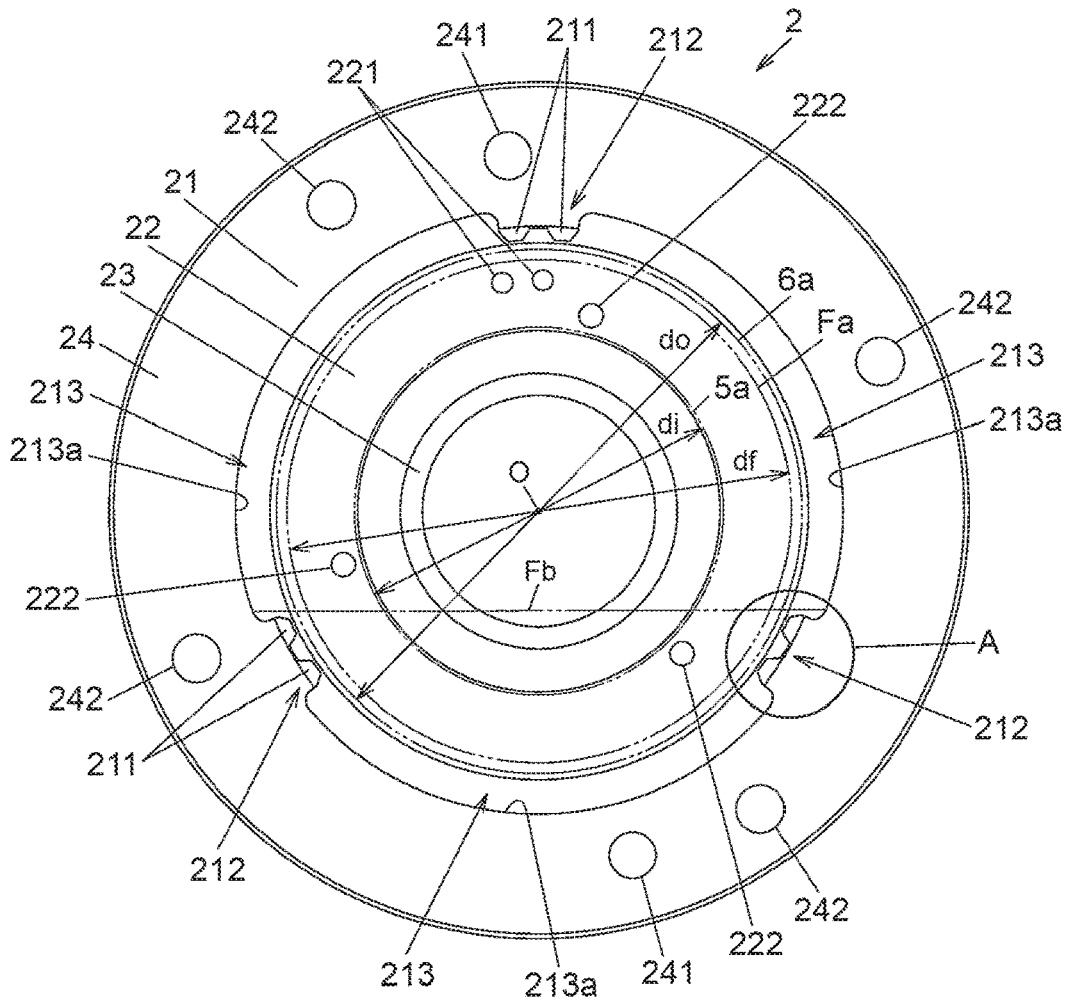
FIGS. 2A and 2B illustrate an end surface of a clutch drum on an opening side, FIG. 2A being an overall view and FIG. 2B being an enlarged view of an part A of FIG. 2A.
Figure 2B:
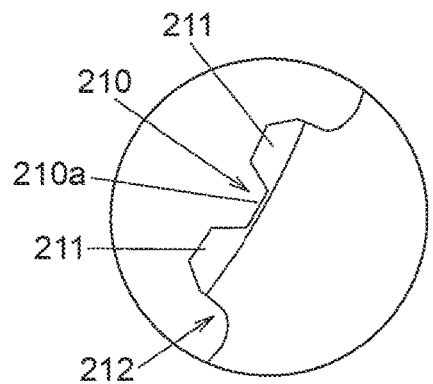
Figure 3:
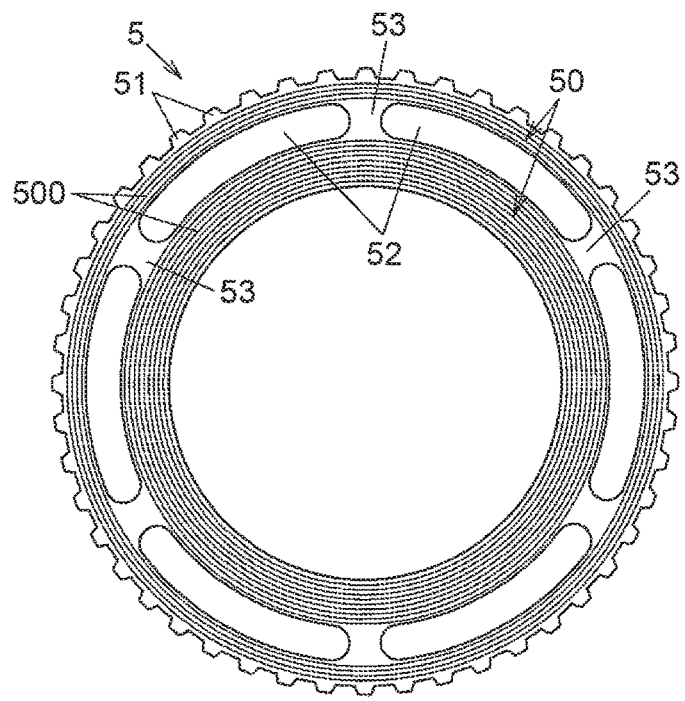
FIG. 3 is a plan view illustrating an outer clutch plate.
Figure 4:
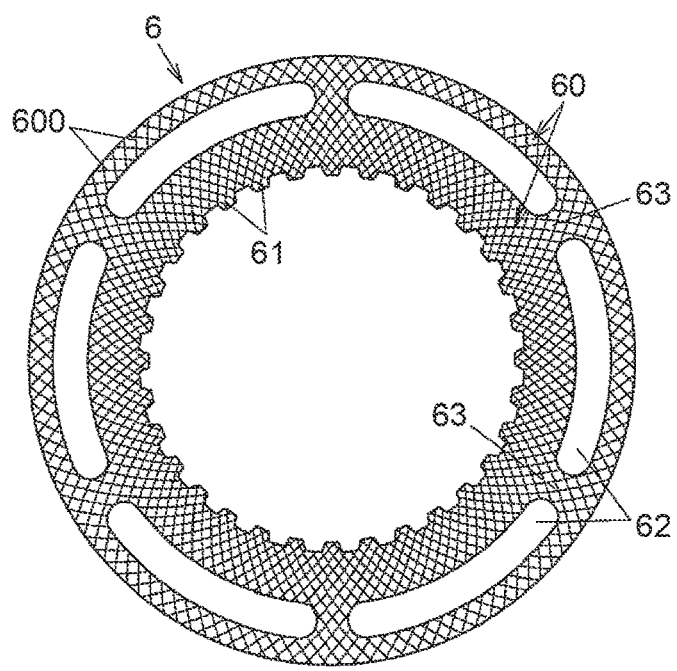
FIG. 4 is a plan view illustrating an inner clutch plate.

FIGS. 2A and 2B illustrate an end surface of the clutch drum 2 on an opening side (cover member 3-side), that is, the end surface close to the cover member 3. FIG. 2A is an overall view, and FIG. 2B is an enlarged view of a part A of FIG. 2A. FIG. 3 is a plan view illustrating the outer clutch plate 5. FIG. 4 is a plan view illustrating the inner clutch plate 6.

The cylindrical part 21 of the clutch drum 2 includes a plurality of projected parts 212 each of which has the plurality of outer spline projections 211 at a distal end part thereof; and a plurality of oil pockets 213 which are formed among the plurality of projected parts 212. The projected parts 212 and the oil pockets 213 are provided alternately in the circumferential direction. The projected parts 212 project inwardly (toward the rotational axis O) from bottom surfaces 213a of the oil pockets 213. Each of the oil pockets 213 has an arc shape when the clutch drum 2 is viewed in the axial direction, and the angle range of each of the oil pockets 213 around the rotational axis O is larger than the angle range of each of the projected parts 212. That is, the length of the oil pocket 213 in the circumferential direction of the clutch drum 2 is larger than the length of the projected part 212 in the circumferential direction in the present embodiment.

In the present embodiment, the three projected parts 212 and three oil pockets 213 are formed in the cylindrical part 21 and each of the projected parts 212 has the two outer spline projections 211 provided adjacently to each other. That is, a total of six outer spline projections 211 are provided in the cylindrical part 21 of the clutch drum 2.

The oil pocket 213 is formed so as to be recessed to a position outward of a bottom surface 210a (see FIG. 2B) of a recessed part 210 located between the two adjacent outer spline projections 211 in the projected part 212. The bottom surface 210a is located inward of the bottom surface 213a of the oil pocket 213. In the cylindrical part 21 of the clutch drum 2, each oil pocket 213 is formed at a toothless part where no outer spline projection 211 is provided. In other words, the oil pocket 213 is formed in the clutch drum 2 by providing the toothless part where no outer spline projection 211 is provided, at a part of the inner peripheral surface of the cylindrical part 21 in the circumferential direction, and making the toothless part further recessed outwardly in the radial direction.

Each of the outer clutch plate 5 and the inner clutch plate 6 has a flat plate shape. The outer clutch plate 5 and the inner clutch plate 6 are disposed between the cylindrical part 21 of the clutch drum 2 and the large diameter part 41 of the inner shaft 4. The outer clutch plate 5 has an outer peripheral end part provided with a plurality of engagement projections 51 which engage with the outer spline projections 211 formed in the cylindrical part 21 of the clutch drum 2. The engagement projections 51 are also provided at portions facing the oil pockets 213, and thus, only part of the plurality of engagement projections 51 engage with the outer spline projections 211.

One engagement projection 51 is fitted in the recessed part 210 located between the pair of adjacent outer spline projections 211 in each of the three projected parts 212 of the clutch drum 2. The word "adjacent" signifies that the outer spline projections 211 are adjacent to each other in the circumferential direction with the recessed part 210, in which one engagement projection 51 is fitted, sandwiched therebetween. The engagement projections 51 of the outer clutch plate 5 engage with the outer spline projections 211 such that the outer clutch plate 5 is movable in the axial direction, and the rotation of the outer clutch plate 5 relative to the clutch housing 1 is restricted.

The outer clutch plate 5 has a plurality of slits 52 at positions facing the annular recessed part 720 of the yoke 72 in the axial direction, each of the slits 52 having an arc shape. In the present embodiment, the six slits 52 are formed along the circumferential direction, and outer peripheral portions and inner peripheral portions of the slits 52 are connected by the same number of bridge parts 53 as the number of the slits 52. The slits 52 prevent a short circuit of a magnetic flux generated by supplying a current to the electromagnetic coil 71.

In a surface of the outer clutch plate 5, which faces the inner clutch plate 6, a portion located radially inward of an outer peripheral end of the inner clutch plate 6 is a sliding surface 50 which is configured to make sliding contact with the inner clutch plate 6. A large number of small grooves 500 which extend in the circumferential direction are formed on the sliding surface 50 of the outer clutch plate 5. Intervals between the small grooves 500 are, for example, 15 to 45 μm, and the groove depth thereof is, for example, 10 to 30 μm. The small grooves 500 have a function of suppressing excessive formation of an oil film and appropriately adjusting the thickness of the oil film.

The inner clutch plate 6 has an inner peripheral end part provided with a plurality of engagement projections 61 which engage with the plurality of inner spline projections 411 formed in the large diameter part 41 of the inner shaft 4. The engagement projections 61 of the inner clutch plate 6 engage with the inner spline projections 411 such that the inner clutch plate 6 is movable in the axial direction and the rotation of the inner clutch plate 6 relative to the inner shaft 4 is restricted. The armature 73 is also provided with engagement projections 731 (illustrated in FIG. 1) similar to the engagement projections 61 of the inner clutch plate 6. The engagement projections 731 engage with the inner spline projections 411. Thus, the armature 73 rotates integrally with the inner shaft 4 and is movable relative to the inner shaft 4 in the axial direction.

The inner clutch plate 6 has a plurality of slits 62 at positions facing the annular recessed part 720 of the yoke 72 in the axial direction, each of the slits 62 having an arc shape. In the present embodiment, the six slits 62 are formed along the circumferential direction, and outer peripheral portions and inner peripheral portions of the slits 62 are connected by the same number of bridge parts 63 as the number of the slits 62. The slits 62 prevent the short circuit of the magnetic flux generated by supplying the current to the electromagnetic coil 71.

In a surface of the inner clutch plate 6, which faces the outer clutch plate 5, a portion located radially outward of an inner peripheral end of the outer clutch plate 5 is a sliding surface 60 which is configured to make sliding contact with the outer clutch plate 5. Frictional sliding of the sliding surface 60 of the inner clutch plate 6 relative to the sliding surface 50 of the outer clutch plate 5 generates a frictional force between the inner clutch plate 6 and the outer clutch plate 5. The sliding surface 60 of the inner clutch plate 6 is provided with a plurality of oil grooves 600 in a grid pattern in which the lubricating oil flows. The oil grooves 600 cause the lubricating oil to flow in the radial direction and suppress abrasion of the sliding surfaces 50 and 60 caused by oil shortage.

When the inner shaft 4 and the inner clutch plate 6 rotate relative to the clutch housing 1, the lubricating oil in the clutch chamber 10 is unevenly distributed toward the outer periphery of the clutch chamber 10 by a centrifugal force. In this state, each of the three oil pockets 213 is filled with the lubricating oil.

Figure 5:
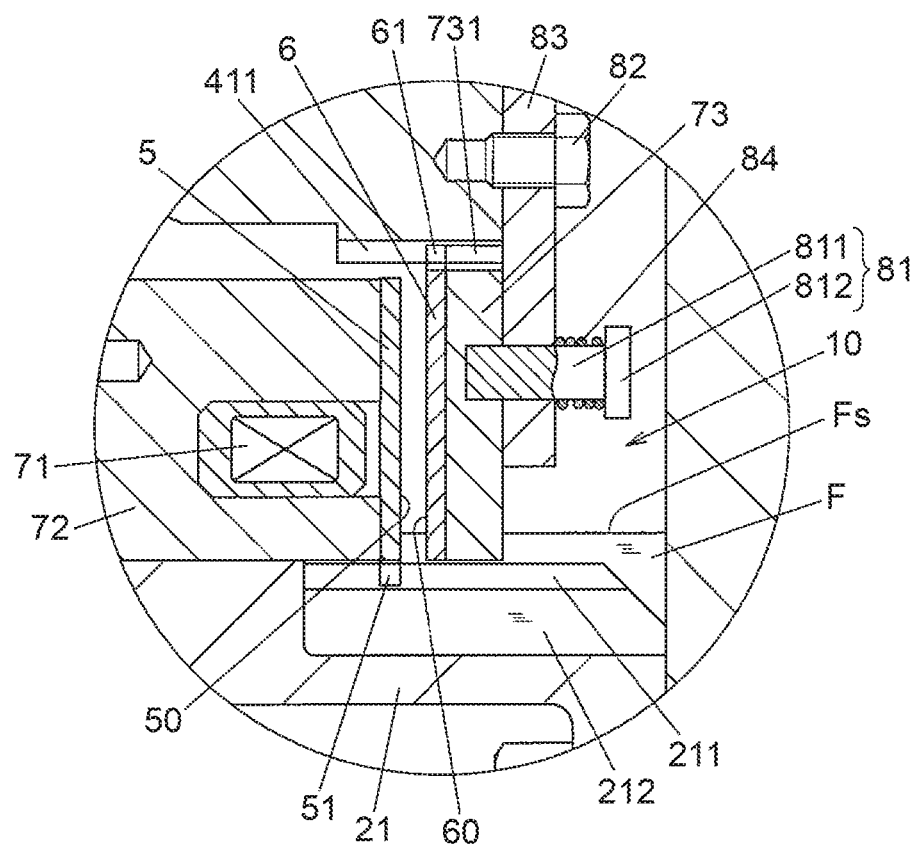
FIG. 5 is an enlarged sectional view of the clutch device when lubricating oil is unevenly distributed toward an outer periphery of a clutch chamber by a centrifugal force.

FIG. 5 is an enlarged sectional view of the clutch device 100 when the lubricating oil F is unevenly distributed toward the outer periphery of the clutch chamber 10 by the centrifugal force.

In the present embodiment, the capacities of the three oil pockets 213 (i.e., the volumes of the portions recessed to the positions outward of the bottom surfaces 210a of the recessed parts 210) are the same. When the capacity of one oil pocket 213 is C and the amount of the lubricating oil F sealed in the clutch chamber 10 is V, the amount V of the lubricating oil F is larger than the total capacity (3×C) of the three oil pockets 213. As illustrated in FIG. 5, the position of an oil surface Fs formed when the lubricating oil F is unevenly distributed toward the outer periphery of the clutch chamber 10 by the centrifugal force is located inward of the outer peripheral end of the inner clutch plate 6, and outward of the inner peripheral end of the outer clutch plate 5. In other words, the position of the oil surface Fs formed when the lubricating oil F is unevenly distributed toward the outer periphery of the clutch chamber 10 by the centrifugal force is located inward of an outer peripheral end of the sliding surface 50 of the outer clutch plate 5, and outward of an inner peripheral end of the sliding surface 50, the sliding surface 50 being configured to make sliding contact with the inner clutch plate 6.

In FIG. 2A, an inner peripheral edge of the outer clutch plate 5 is indicated by an alternate long and two short dashes line 5a, and an outer peripheral edge of the inner clutch plate 6 is indicated by an alternate long and two short dashes line 6a. In FIG. 2A, an alternate long and two short dashes line Fa indicates the position of the oil surface Fs formed when the lubricating oil F is unevenly distributed toward the outer periphery of the clutch chamber 10 by the centrifugal force such that the oil surface Fs of the lubricating oil F extends in a circle around the rotational axis O.

The lubricating oil F in an amount that satisfies the following expression (1) is sealed in the clutch chamber 10:

$$di+(do-di)\times 0.05 \leq df \leq di+(do-di)\times 0.5 \qquad (1),$$

where "do" represents the outside diameter of the sliding surface 50 of the outer clutch plate 5 and the sliding surface 60 of the inner clutch plate 6, "di" represents the inside diameter of the sliding surface 50 of the outer clutch plate 5 and the sliding surface 60 of the inner clutch plate 6, and "df" represents the inside diameter of the oil surface Fs formed when the lubricating oil F is unevenly distributed toward the outer periphery of the clutch chamber 10 by the centrifugal force.

In other words, when the lubricating oil F is unevenly distributed toward the outer periphery of the clutch chamber 10 by the centrifugal force, areas in the sliding surfaces 50 and 60 of the outer clutch plate 5 and the inner clutch plate 6 are immersed in the lubricating oil F, the areas including and close to the outer peripheries of the sliding surfaces 50 and 60, and having a radial width corresponding to 5% to 50% of the radial width of the sliding surfaces 50 and 60.

When a current is applied to the electromagnetic coil 71 in the above-described state, a magnetic flux is generated in a magnetic path G indicated by a broken line in FIG. 1, and the armature 73 is attracted toward the yoke 72 by a magnetic force. Thus, the outer clutch plate 5 and the inner clutch plate 6 are pressed toward the yoke 72 by the armature 73, and thus, the sliding surfaces 50 and 60 make frictional contact with each other. Then the rotation speed of the inner shaft 4 is reduced by a frictional force generated between the outer clutch plate 5 and the inner clutch plate 6. When the rotation speed of the inner shaft 4 is reduced, the lubricating oil F stored in the oil pockets 213 is moved downward by a gravitational force, and thus, the radial width of the areas in the sliding surfaces 50 and 60 immersed in the lubricating oil F in a bottom part of the clutch chamber 10 increases. Thus, the lubricating oil F suppresses the abrasion of the sliding surfaces 50 and 60 when the inner clutch plate 6 rotates relative to the outer clutch plate 5 while the outer clutch plate 5 and the inner clutch plate 6 make the frictional contact with each other.

When a current is applied to the electromagnetic coil 71, part of the lubricating oil F present between the outer clutch plate 5 and the inner clutch plate 6 before the current is applied to the electromagnetic coil 71 is supplied to the sliding surfaces 50 and 60 through the oil grooves 600 and the other part of the lubricating oil F is discharged to the oil pockets 213.

When the frictional force generated between the outer clutch plate 5 and the inner clutch plate 6 becomes larger than the torque acting on the rotary member connected to the inner shaft 4, the rotation of the inner shaft 4 stops and the rotary member is brought to a locked state in which the rotary member is unable to rotate relative to the vehicle body. In FIG. 2A, the oil surface Fs of the lubricating oil F in the locked state is indicated by an alternate long and two short dashes line Fb. Note that a bottom side of FIG. 2A corresponds to a bottom side in a vertical direction in a state where the clutch device 100 is provided in the vehicle.

According to the embodiment, it is possible to achieve effects described below.

(1) The clutch drum 2 forming the clutch housing 1 is provided with the oil pockets 213 which are formed so as to be recessed to the positions outward of the bottom surfaces 210a of the recessed parts 210 in the projected parts 212. Therefore, when the inner shaft 4 rotates while a current is not supplied to the electromagnetic coil 71, the lubricating oil F is stored into the oil pockets 213 by the centrifugal force generated due to the rotation of the inner shaft 4. Thus, a drag torque generated by viscosity of the lubricating oil F is reduced. Further, when the inner clutch plate 6 rotates relative to the outer clutch plate 5 while the outer clutch plate 5 and the inner clutch plate 6 make the frictional contact with each other, the abrasion of the sliding surfaces 50 and 60 is suppressed by the lubricating oil F present in the bottom of the clutch chamber 10. That is, it is possible to achieve both the reduction of the drag torque and the suppression of the abrasion of the clutch plates.

(2) When a current is applied to the electromagnetic coil 71, the excess lubricating oil F present between the outer clutch plate 5 and the inner clutch plate 6 is quickly discharged to the oil pockets 213. Thus, after the current is applied to the electromagnetic coil 71, the frictional force generated between the outer clutch plate 5 and the inner clutch plate 6 quickly increases. That is, responsiveness of the clutch device 100 is improved.

(3) The oil pockets 213 are formed at the toothless parts where the outer spline projections 211 are not provided in the clutch drum 2. Therefore, it is possible to form the oil pockets 213 without increasing the length of the clutch device 100 in the axial direction.

(4) The position of the oil surface Fs formed when the lubricating oil F is unevenly distributed toward the outer periphery of the clutch chamber 10 by the centrifugal force is located inward of the outer peripheral end of the inner clutch plate 6, and outward of the inner peripheral end of the outer clutch plate 5. Therefore, part of the lubricating oil F present between the outer clutch plate 5 and the inner clutch plate 6 is immediately supplied to the sliding surfaces 50 and 60 when the current is applied to the electromagnetic coil 71. Thus, the abrasion of the sliding surfaces 50 and 60 is suppressed.

(5) The lubricating oil F in the amount that satisfies the expression (1) described above is sealed in the clutch chamber 10. Therefore, it is possible to more reliably achieve both the reduction of the drag torque and the suppression of the abrasion of the clutch plates.

(6) The plurality of projected parts 212 and the plurality of oil pockets 213 are provided alternately in the circumferential direction in the cylindrical part 21 of the clutch drum 2, each of the plurality of projected parts 212 having the plurality of outer spline projections 211 at the distal end part thereof. Thus, the total capacity of the plurality of oil pockets 213 is increased.

Although the embodiment of the disclosure has been described above, the disclosure is not limited to the embodiment. The embodiment may be appropriately modified without departing from the scope of the disclosure. For example, although the inner clutch plate 6 is disposed between the outer clutch plate 5 and the armature 73 in the embodiment, the inner clutch plate 6 may be omitted. In the case, the armature 73 generates, as an inner friction member, a frictional force between the armature 73 and the outer clutch plate 5.

What is claimed is:

1. A clutch device comprising:
   an outer member including a cylindrical part having an inner peripheral surface provided with a plurality of outer projections extending in an axial direction;
   an inner member disposed so as to be rotatable relative to the outer member;
   an outer friction member engaging with the outer projections such that the outer friction member is movable in the axial direction and rotation of the outer friction member relative to the outer member is restricted;
   an inner friction member whose rotation relative to the inner member is restricted, and which generates a frictional force between the inner friction member and the outer friction member; and
   a lubricating oil sealed in a clutch chamber located between the outer member and the inner member, the lubricating oil lubricating sliding between the outer friction member and the inner friction member, wherein
   the outer member is provided with an oil pocket that is recessed to a position outward of a bottom surface of a recessed part located between a pair of adjacent outer projections among the plurality of the outer projections.

2. The clutch device according to claim 1, wherein the oil pocket is provided at a toothless part where none of the outer projections is provided, the toothless part being provided at a part of the cylindrical part in a circumferential direction.

3. The clutch device according to claim 1, wherein a position of an oil surface formed when the lubricating oil is unevenly distributed toward an outer periphery of the clutch chamber by a centrifugal force is located inward of an outer peripheral end of a sliding surface of the outer friction member, and outward of an inner peripheral end of the sliding surface, the sliding surface being configured to make sliding contact with the inner friction member.

4. The clutch device according to claim 3, wherein the lubricating oil in an amount that satisfies a following expression is sealed in the clutch chamber:

$$di+(do-di)\times 0.05 \leq df \leq di+(do-di)\times 0.5,$$

where do and di represent an outside diameter and an inside diameter of the sliding surface, respectively, and df represents an inside diameter of the oil surface formed when the lubricating oil is unevenly distributed toward the outer periphery of the clutch chamber by the centrifugal force.

5. The clutch device according to claim 1, wherein:
   a plurality of the oil pockets are provided; and
   a plurality of projected parts and the plurality of the oil pockets are provided alternately in a circumferential direction in the cylindrical part of the outer member, each of the projected parts projecting inwardly and having the plurality of the outer projections at a distal end part thereof.

6. The clutch device according to claim 1, further comprising:
an electromagnetic coil configured to generate a magnetic force when a current is applied to the electromagnetic coil;
a yoke configured to hold the electromagnetic coil; and
an armature configured to move in the axial direction in response to the magnetic force, wherein
the inner friction member engages with a plurality of inner spline projections provided on an outer peripheral surface of the inner member such that the inner friction member is movable in the axial direction and the rotation of the inner friction member relative to the inner member is restricted, the inner friction member being disposed between the yoke and the armature.

* * * * *